(12) United States Patent
Robison et al.

(10) Patent No.: US 6,812,811 B2
(45) Date of Patent: Nov. 2, 2004

(54) POWER DISCRIMINATING SYSTEMS

(75) Inventors: Clark E. Robison, Tomball, TX (US);
Neal G. Skinner, Lewisville, TX (US);
John J. Goiffon, Dallas, TX (US);
Charles M. Pool, Bedford, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/145,319

(22) Filed: May 14, 2002

(65) Prior Publication Data

US 2003/0214366 A1 Nov. 20, 2003

(51) Int. Cl.⁷ .......................... H03H 7/00; H03H 11/04
(52) U.S. Cl. ........................................ 333/175; 333/176
(58) Field of Search .................................. 333/132, 175, 333/176; 361/58, 113, 118

(56) References Cited

U.S. PATENT DOCUMENTS

| | | | | |
|---|---|---|---|---|
| 4,080,552 A | * | 3/1978 | Brown | 318/128 |
| 4,636,934 A | | 1/1987 | Schwendemann et al. | 364/132 |
| 4,720,681 A | * | 1/1988 | Sinclair | 324/339 |
| 5,095,285 A | * | 3/1992 | Khatibzadeh | 330/306 |
| 5,260,862 A | * | 11/1993 | Marsh | 363/39 |
| 5,594,375 A | * | 1/1997 | Carlson et al. | 327/129 |
| 5,920,468 A | * | 7/1999 | Brisson et al. | 363/39 |
| 5,937,945 A | | 8/1999 | Bussear et al. | 166/250.15 |
| 5,975,204 A | | 11/1999 | Tubel et al. | 166/250.15 |
| 5,994,982 A | * | 11/1999 | Kintis et al. | 333/235 |
| 6,079,494 A | | 6/2000 | Longbottom et al. | 166/313 |

* cited by examiner

Primary Examiner—Robert Pascal
Assistant Examiner—Dean Takaoka
(74) Attorney, Agent, or Firm—Michael W. Piper (57) ABSTRACT

The present invention relates to a control system for selectively supplying electrical power in a remote environment. The system comprises a plurality of electrical circuits, each designed to operate over a unique frequency passband. Power transmitted within the frequency passband of a circuit is filtered through that circuit to power a corresponding remote device. One or more remote devices can be simultaneously powered by transmitting power within the frequency passbands of the corresponding circuits. It is advantageous to design relatively narrow passbands to accommodate a relatively large number of circuits and corresponding devices for remote operation and a triac, rectifier or other suitable turn-on gate can be incorporated into each circuit to effectively control the width of the frequency passband of each circuit. Alternatively, an operational amplifier could be used.

124 Claims, 3 Drawing Sheets

POWER DISCRIMINATING SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to control systems and apparatus for selectively supplying electrical power in a remote environment. More particularly, the invention relates to systems and apparatus for remotely filtering power through one or more electrical circuits located downhole in oil and gas wells to selectively power a device proximate the electrical circuit.

BACKGROUND OF THE INVENTION

In the operation of electrically powered equipment, systems and apparatus are sometimes employed to operate the equipment in remote and hostile environments. For example, in the operation of hydrocarbon wells, the production of hydrocarbons to the surface of the well at times requires the assistance of downhole production systems. Generally, after a well is drilled, cased and cemented, a fluid path from the wellbore is established with the zones of reservoirs containing hydrocarbons. One or more production tubing strings are traditionally installed in the cased wellbore to accommodate the flow of hydrocarbons to the surface. While hydrocarbons from some reservoirs flow through the production tubing to the surface relatively unassisted, other reservoirs require the assistance of production systems which are installed downhole. Such production equipment is traditionally coupled to the tubing string.

One type of production system is a gas lift operation that includes a valve system for controlling the injection of relatively high pressure gas from the surface into the wellbore. The pressurized gas is injected into the annular space between the casing and tubing and enters the tubing through downhole gas lift valves. The gas lifts the fluids that are collecting in the tubing to assist the flow of hydrocarbon fluids to the surface. Gas injection into the well thus requires the operation of the downhole gas lift valve to control the injection gas flow. The gas lift valves are strategically positioned along the production tubing string in relatively close proximity to the hydrocarbon laden zones. The valves are normally closed to restrict the flow of injection gas from the casing into the tubing and are opened to allow the flow of injection gas into the tubing. Generally, gas lift valves are hydraulically operated. By controlling the flow of a hydraulic fluid, a downhole hydraulic valve is actuated to control the flow of fluid into the gas lift valve. The gas lift valve is moved from a closed to an open position for as long as necessary to affect the flow of the pressurized gas from the casing into the tubing. Such gas lift valves are position instable. Upon interruption of the hydraulic control pressure, the gas lift valve returns to its normally closed configuration.

In a gas lift system, there is a requirement for the periodic operation of a motor valve at the surface of the well to control either the flow of fluids from the well or the flow of injection gas into the well to assist in the hydrocarbon production. These motor valves are controlled by timing mechanisms and are set at predetermined time periods so that a well is either restricted from the flow of gas or liquids to the surface or is allowed to freely produce.

It will be appreciated that timed intermittent operation of motor valves and similar devices located at the surface of a well is often not adequate to control either outflow from the well or gas injection to the well so as to optimize well production. Computerized controllers have thus been developed for controlling downhole production equipment. In general, there are control systems that use a surface microprocessor and downhole control systems which are initiated by surface control signals. The control electronics of these computerized systems are located at the surface of a well and communicate with sensors and electromechanical devices near the surface. For example, some systems include fully programmable microprocessor controllers which monitor downhole parameters such as pressure and flow and control the operation of gas injection to the well, outflow of fluids from the well or shutting in of the well. These systems may include battery powered solid state circuitry comprising a keyboard, a programmable memory, a microprocessor, control circuitry and a liquid crystal display. Other systems use a controller having serial and parallel communication ports through which all communications to and from the controller pass. Hand held devices or portable computers capable of serial communication may access the controller. A telephone modem or telemetry link to a central host computer may also be used to permit several controllers to be accessed remotely.

Downhole control systems generally include downhole microprocessor controllers, electromechanical control devices and sensors. For example, some downhole microprocessor controllers transmit control signals upon actuation from a surface or other external control signal. Other production well control systems comprise downhole sensors, downhole electromechanical devices and downhole computerized control electronics wherein the control electronics automatically control the electromechanical devices based on input from the downhole sensors. The downhole computerized control system will monitor actual downhole parameters such as pressure, temperature, flow and gas influx, all sensed by the downhole sensors, and automatically execute control instructions when the monitored downhole parameters are outside a selected operating range. The automatic control instructions will then cause an electromechanical control device such as a valve to actuate the appropriate tool. The selected operating range for each tool controlled by the downhole control system is programmed in a downhole memory either before or after the control system is lowered downhole. A transceiver may be used to change the operating range or alter the programming of the control system from the surface of the well or from a remote location. A power source provides energy to the downhole control system. Power for the power source can be generated in the borehole, at the surface or via energy storage devices such as batteries, or a combination thereof. The power source provides electrical voltage and current to the downhole electronics, electromechanical devices and sensors in the borehole.

While it is recognized that hydrocarbon production wells will have increased production efficiencies and lower operating costs if surface computer based controllers and downhole microprocessor controllers are used, the implemented control systems of the prior art nevertheless have certain drawbacks. In particular, the controllers of such systems include complex circuitry that is sensitive to environment conditions such as pressure and temperature. The downhole circuitry would thus require containment in canisters capable of withstanding hostile conditions that are present in downhole environments. In addition, the substantial numbers of components which comprise the microprocessors create reliability, repair and maintenance issues which are relatively expensive to address, as the downhole circuitry would have to be removed from the well in order to be repaired or replaced.

While the control system and apparatus of the present invention are discussed in the context of a downhole environment, it will be appreciated that the present invention is also application to other systems which require operation in remote and hostile conditions.

SUMMARY OF THE INVENTION

Through significant time and effort, it has been found that the difficulties associated with microprocessors could be avoided by the control system of the present invention that uses relatively simple electrical circuitry. As will be appreciated by one skilled in the art, the novel apparatus and control system of the present invention are applicable to other types of equipment other than downhole equipment for which remote operation is desired. The control system comprises electrical circuits of frequency selecting units having discrete frequency passbands for selectively filtering power to corresponding devices, either individually or simultaneously with other frequency selecting units. Thus the control system of the present invention is well suited and designed for use in connection with wells having multiple hydrocarbon zones.

The frequency selecting units of the electrical circuits have inductance and capacitance characteristics which define their frequency passbands. Power transmitted at a frequency within a discrete frequency passband is filtered through the electrical circuit of the frequency selecting unit corresponding to the passband. Alternatively, power can be transmitted at frequencies within a plurality of frequency passbands for filtering through multiple frequency selecting units in a multi-unit system to selectively and simultaneously power a plurality of devices corresponding to the frequency selecting units. The apparatus and systems described herein have allowed for electrical components that traditionally do not have severe pressure and temperature limitations and thus can withstand relatively hostile conditions that may be found downhole or in other remote environments. In addition, the control system and apparatus of the present invention is reliable and robust as it comprises relatively few components.

The power source which supplies the electrical power to the control system of the present invention can be proximate any desired location. For example, the source can be proximate the surface of the well, located downhole or in a remote area. In addition, the power source can be variable frequency or multiple frequencies so long as the power is transmittable within the frequency passbands of the frequency selecting units of the present invention. Further, DC power may also be appropriate.

The inductance and capacitance characteristics of the frequency selecting units can be provided by any suitable component, such as, for example, inductors and capacitors. In addition, the inductance or capacitance could be supplied by a reactive electromotive device such as a motor, a solenoid or a piezoelectric device. As the power frequency range for each frequency selecting unit depends on at least the inductance or capacitance rating of the frequency selecting unit, each unit can be uniquely designed to filter power within a discrete frequency passband. Different inductance and capacitance values for each frequency selecting unit can be used to achieve discrete frequency passbands. Similar inductance but different capacitance characteristics could also be used for each unit to achieve the discrete frequency passbands. Alternatively, different inductance but similar capacitance characteristics for each frequency selecting unit could also be used. Further, the inductance and capacitance components of the frequency selecting unit can be in series or in parallel to create the discrete passbands. Thus, by transmitting power within a selected discrete frequency passband, a device corresponding to the frequency selecting unit that filters power within that passband can be powered. Power can also be transmitted within a plurality of frequency passbands to selectively and simultaneously power a plurality of devices corresponding to the filtering frequency selecting units.

The devices which can be selectively powered by using frequency selecting units which filter power through an electrical circuit include without limitation batteries, sensors and telemetry. In addition, actuable devices can be powered by certain frequency selecting units which not only filter power but also convert an electrical current into a force to operate the actuable device. For example, a solenoid would provide not only the inductance of the frequency selecting unit but could also operate to open or close a gas lift valve or other actuable device. Other examples include motors and other electric actuators. In addition, a piezoelectric device would provide the capacitance of the frequency selecting unit and would also operate the actuable device. Thus, in an embodiment of the present invention, frequency selecting units selectively filter power through a corresponding electrical circuit to actuate devices proximate the units.

In another embodiment of the present invention, the electrical circuits of the control system are designed to accommodate a frequency-shifting characteristic which is inherent in certain types of frequency selecting units. For example, the frequency-shifting characteristic of a solenoid comprises a change in the inductance of the solenoid as it moves from its initial actuation through its stroke. In other frequency selecting units, the inductance rating may change during its initial powering through its continued operation. The frequency band width allocated to each frequency selecting unit should be sufficiently broad to accommodate the frequency shift so that the unit is continually powered for uninterrupted operation. However, minimal overlap of passbands between the frequency selecting units should be maintained in order to preserve the discreteness of the operable frequency passband for each frequency selecting unit.

Thus, a control system having frequency passbands which are sufficiently broad to accommodate the frequency shifting of the frequency selecting units yet which have minimal overlap with other passbands is desirable. A limitation to the system frequency band width design is the electrical conductor which transmits power downhole to the frequency selecting units. The electrical conductor inherently has frequency limitations which allow it to accommodate only a finite band width. Thus, it is advantageous to minimize the band widths for each frequency selecting unit so that the number of units for remote operation can be maximized. Accordingly, in another embodiment of the control system of the present invention, a single directional silicon controlled rectifier for direct current circuits or a bi-directional triac for alternating circuits is provided proximate one or more frequency selecting units. The rectifier and triac, so-called "turn-on gates," filter power within the appropriate frequency passband to the frequency selecting unit. For example, the triac is a three terminal device that requires a small input of power to one of the terminals in order to create essentially a short between the other two terminals. The switch does not turn on until power input is supplied to the first terminal which then powers the frequency selecting unit proximate the switch. An advantage of the turn-on gate is the conservation of power to the other unused frequency selecting units, as these units would receive some amount of power, although not in an amount sufficient to operate the units. Conserving power minimizes the frequency band width required to operate the desired frequency selecting unit and continually power it. Thus, the turn-on gate circuit provides narrower discrete frequency passbands which allow more frequency selecting units on a single electrical conductor. The turn-on device advantageously allows only the selected frequency selecting units to receive power, while the other frequency selecting units receive essentially no power, thus minimizing the frequency dependent limitations inherent in the electrical conductor. Thus, by utilizing a triac turn-on gate with the frequency selecting units, a larger number of units can be controlled using the same electrical conductor downhole.

In yet another embodiment, a high temperature operational amplifier or op-amp could be used in a control system of the present invention for additional and effective filtering of power through the electrical circuits of the present invention. Each frequency selecting unit would have a uniquely rated op-amp such that power transmitted within the selected frequency passbands having a discrete current flow would power the corresponding frequency selecting units.

The invention is more particularly shown and described in the accompanying drawings and materials included herein.

BRIEF DESCRIPTION OF THE DRAWINGS

For a more complete understanding of the present invention, and for further details and advantages thereof, reference is now made to the following Detailed Description of the Drawings taken in conjunction with the accompanying drawings, in which.

DETAILED DESCRIPTION OF THE DRAWINGS

Figure 1:
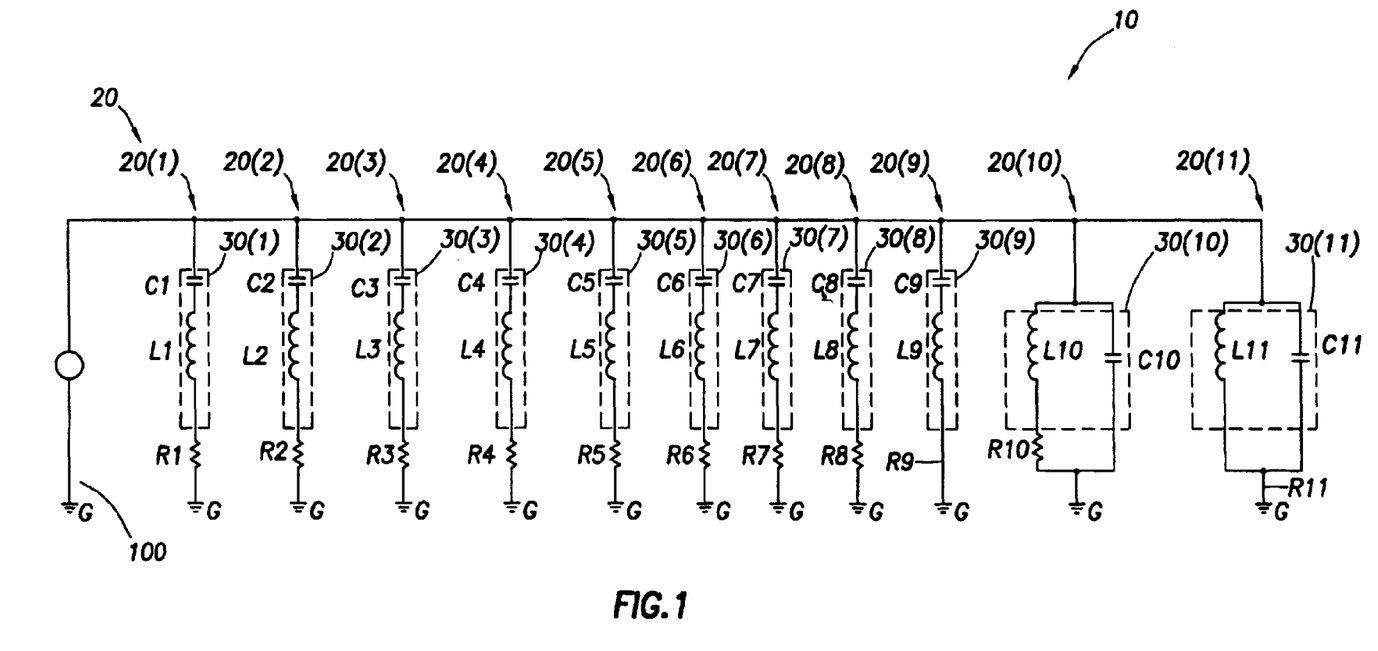
FIG. 1 provides an exemplary diagram of an electrical circuitry of the present invention.

Representatively and schematically illustrated in FIG. 1 are examples of electrical circuits of a control system as contemplated by the present invention. While relatively simple inductor, capacitor and resistor circuits are illustrated, the invention can comprise other circuitry having similar electrical characteristics. Accordingly, the scope of the invention is not limited by the detailed description but encompasses any of a number of circuitry having similar electrical characteristics, as would be understood by one skilled in the art. The control system 10 contemplated by the present invention comprises electrical circuitry 20 having a multiple of circuits 20(1)–20(11). Circuits 20(1)–20(11) are preferably located in a remote environment example, in a downhole location. Power source 100 which provides electrical power to circuits 20(1)–20(11), is proximate a location remote from the circuits. For example, power source 100 for circuits 20(1)–20(11) can be located downhole or above ground and, more particularly, can be proximate the surface of the well. An electrical conductor suitable for installation in a remote and hostile, environment (not shown) transmits power from power source 100 to electrical circuitry 20 located in the remote environment. The electrical conductor can be any of a number of devices which are suitable for transmitting power, including but not limited to, an electrical wireline or cable.

Electrical circuits 20(1)–20(11) comprise frequency selecting units 30(1)–30(11) respectively, having capacitance C1–C11 and inductance L1–L11 characteristics, respectively. While the wire through each circuit may provide sufficient line resistance, as represented by R9, R11 of electrical circuits 20(9), 20(11), respectively, resistors may be added to achieve the desired resistance for the circuits, as represented by R1–R8, R10 for circuits 20(1)–20(8), 20(10), respectively. In addition, the circuits can be in series or parallel or a combination thereof, as illustrated, or any other configurations which are suitable to achieve the desired electrical characteristics of the present invention, as understood by one skilled in the art.

The power frequency operating range for each circuit 20(1)–20(11) is thus defined by its capacitance, resistance and inductance rating RLC(1)–RLC(11), respectively, and each circuit 20(1)–20(11) is designed to have a unique RLC(1)–RLC(11). Power transmitted within a frequency passband from power source 100 would be filtered by the frequency selecting unit 30(1)–30(11) having inductance L1–L11 and capacitance C1–C11 characteristics which are designed for that frequency passband through the corresponding circuit 20(1)–20(11) to power a device (not shown). Thus, by selecting the frequency passband over which to transmit power, a device can be selected and powered remotely. Multiple devices can also be selected and simultaneously powered by transmitting power within the multiple frequency passbands of their frequency selecting units.

A discrete frequency passband for each remotely located electrical circuit 20(1)–20(11) can be designed by varying the inductance L1–L11 and the capacitance C1–C11 of the frequency selecting units 30(1)–30(11), respectively, to achieve RLC values which are unique to each circuit. Unique operating frequency passbands for each circuit 20(1)–20(11) can also be achieved with frequency selecting units 30(1)–30(11) having different inductance but similar capacitance. Alternatively, frequency selecting units 30(1)–30(11) could have similar inductance L1–L11 but discrete capacitance C1–C11. The underlying electrical principle for designing frequency passbands is $f=(1/2\pi)(1/\sqrt{LC})$ where f is frequency measured in hertz (Hz), L is inductance measured in Farads (F) and C is capacitance measured in Henrys (H). By way of illustration and not by way of limitation, the following example of relative resistance, inductance and capacitance values for each electrical circuit 20(1)–20(8) illustrated in FIG. 1 is provided.

| Electrical Circuit | Capacitance (Farads(F)) | Inductance (Henrys(H)) | Resistance (Ohms(Ω)) |
|---|---|---|---|
| 20(1) | C1 = 2.5e–6 | L1 = 1000 m | R1 = 100 |
| 20(2) | C2 = 6.3e–7 | L2 = 1000 m | R2 = 100 |
| 20(3) | C3 = 2.8e–7 | L3 = 1000 m | R3 = 100 |
| 20(4) | C4 = 1.6e–7 | L4 = 1000 m | R4 = 100 |
| 20(5) | C5 = 1.0e–7 | L5 = 1000 m | R5 = 100 |
| 20(6) | C6 = 7.0e–8 | L6 = 1000 m | R6 = 100 |
| 20(7) | C7 = 5.2e–8 | L7 = 1000 m | R7 = 100 |
| 20(8) | C8 = 3.9e–8 | L8 = 1000 m | R8 = 100 |

As illustrated above, the inductance and resistance values of electrical circuits 20(1)–20(11) can be relatively similar while the capacitance can be different to achieve a unique RLC rating for each circuit. This illustration assumes the inductance value of the frequency selecting units 30(1)–30(8) to be approximately 1000 mH with varying capacitance. The resistance of circuits 20(1)–20(8) is approximately 100 Ohms. However, as would be understood by those skilled in the art, a multiple of electrical circuits could be designed, including circuits having varying inductance and resistance values, by adhering to the underlying electrical principle of $f=(\frac{1}{2}\pi)(1/\sqrt{LC})$.

Figure 2:
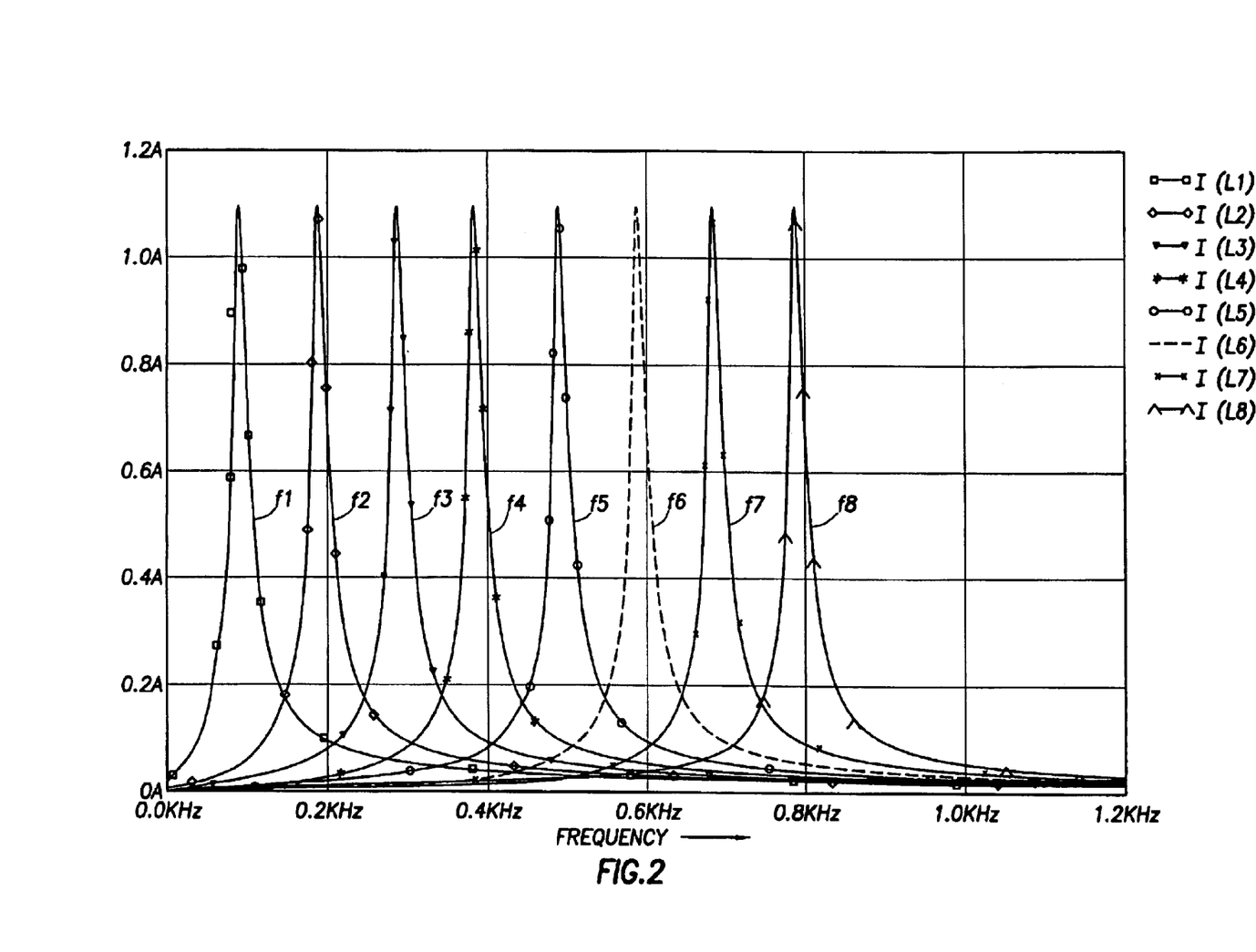
FIG. 2 provides a chart illustrating characteristic frequency passbands and corresponding current values for exemplary frequency selecting units of the present invention.

Referring to FIG. 2, characteristic operating frequency passbands f1–f8 for each electrical circuit 20(1)–20(8) of FIG. 1 having relative capacitance, inductance and resistance values of the above example are illustrated. Each frequency selecting unit 30(1)–30(8) of circuit 20(1)–20(8), respectively, represented by its inductance value L1–L8, filters power within the depicted frequency passband. The rate of current through the frequency selecting unit 30(1)–30(8) varies according to the location within the filter passband of the power frequency of the applied voltage. To allow higher rates of current flow, the operating passband f1–f8 for each circuit 20(1)–20(11) narrows while at lower rates the passband f1–f8 broadens. For example, the relative frequency passband of circuits 20(1)–20(8) at about 0.2 amps of current is approximately 0.1 kilohertz (KHz) wide, while the relative passband of the circuits at about 0.4 amps is approximately 0.05 KHz. Thus, circuit 20(1) at about 0.2 amps of current flow through its frequency selecting unit 30(1) has an operating frequency of approximately 0.05 KHz to 0.15 KHz, while the frequency at 0.4 amps is in the range of approximately 0.08 to 0.13 KHz. Further, the operating frequency for a circuit decreases as its capacitance rating increases. For example, circuit 20(1) represented by its inductance L1 and having a relatively large capacitance C1 of 2.5 e–6 Farads, has an operating frequency in the range of approximately 0.05 to 0.15 KHz at about 0.2 amps of current. In contrast, circuit 20(8) represented by inductance L8 and a lower capacitance C8 of 3.9 e–8 Farads has a higher operating frequency in the range of approximately 0.77 to 0.88 KHz.

The frequency passband for each frequency selecting unit 30(1)–30(11) should be discrete so that power from power source 100 transmitted within the selected frequency passband is filtered through a circuit in an amount sufficient to power the device coupled to that circuit. Power can also be transmitted within multiple frequency passbands to simultaneously power multiple devices corresponding to the selected circuits. As shown in FIG. 2, at about 0.3 amps or more of current, each frequency selecting unit 30(1)–30(8) filters power through the corresponding circuit 20(1)–20(8), respectively, within a unique frequency passband. Thus, for example, power of about 0.3 amps of current or more which is transmitted in a frequency passband to a control system would power a device corresponding to a frequency selecting unit which filters power through that discrete frequency passband. At lower rates of current flow, for example less than 0.2 amps, the frequency passbands of circuits 20(1)–20(8) broaden, and overlap as the current approaches zero. Systems having devices with lower power requirements would have overlapping frequency passbands and thus are undesirable.

Each of circuits 20(1)–20(11) is coupled to a device (not shown) for which remote powering is desired. Any number of devices suitable for operation remotely is contemplated by the present invention. For example, in a hydrocarbon production system, suitable devices include without limitation gas lift valves, packers, slidable sleeves, mandrels, motors, batteries and telemetry systems. Traditionally, some downhole devices are positioned along a production tubing string. While the production devices can be proximate the hydrocarbon zones of a well, other production designs could be used to achieve the desired hydrocarbon production from the well. Circuits 20(1)–20(11) of electrical circuitry 20 are particularly suitable for use in connection with wells having multiple hydrocarbon zones. Electrical circuitry 20 can be modified to increase or decrease the number of circuits 20(1)–20(11) as required for a particular downhole hydrocarbon system. For example, a production tubing string may have fifty or more remotely operable devices. Alternatively, six to twelve devices may be located along a tubing string. Further, a production string may have three to four devices for which remote operation and control are desirable. To accommodate each of the foregoing production systems or other remote systems, electrical circuits may be added or removed to approximate the number of devices to be powered in a remote environment.

In addition to, filtering power transmitted within a discrete frequency passband, certain frequency selecting units contemplated by the present invention can also function to convert the electrical current into a force to operate an actuable device. The devices could include reactive electromotive devices, such as, for example, a solenoid, a motor or a piezoelectric device. A solenoid coupled to a capacitor to provide the inductance L1–L11 and the capacitance C1–C11, respectively, of each circuit 20(1)–20(11), would convert current to force to actuable a gas lift valve coupled thereto. Alternatively, a piezoelectric device would provide the capacitance C1–C11 of each circuit 20(1)–20(11) and would also convert current to force to actuate a device operatively coupled thereto.

In addition, electrical circuitry 20 of the present control system 10 can be designed to accommodate a frequency shifting characteristic inherent in certain frequency selecting units. For example, a frequency selecting unit comprising a solenoid experiences a change in inductance from the initial actuation of the solenoid through its stroke. A change in inductance L1–L11 effectively broadens the operating frequency passband f1–f11 of circuit 20(1)–20(11). Accordingly, the frequency passband which is designed for each of circuits 20(1)–20(11) should be sufficiently broad to include the frequency shift of the solenoid so that it is continually engaged throughout its stroke for uninterrupted operation of the corresponding downhole device to be powered. In addition, the operating frequency passband and power requirement for each circuit 20(1)–20(11) should be designed so that each circuit maintains its unique operating frequency at a selected level of current flow so that sufficient power is filtered to only the desired electromotive devices for actuation and selective control of the corresponding downhole devices.

Figure 3:
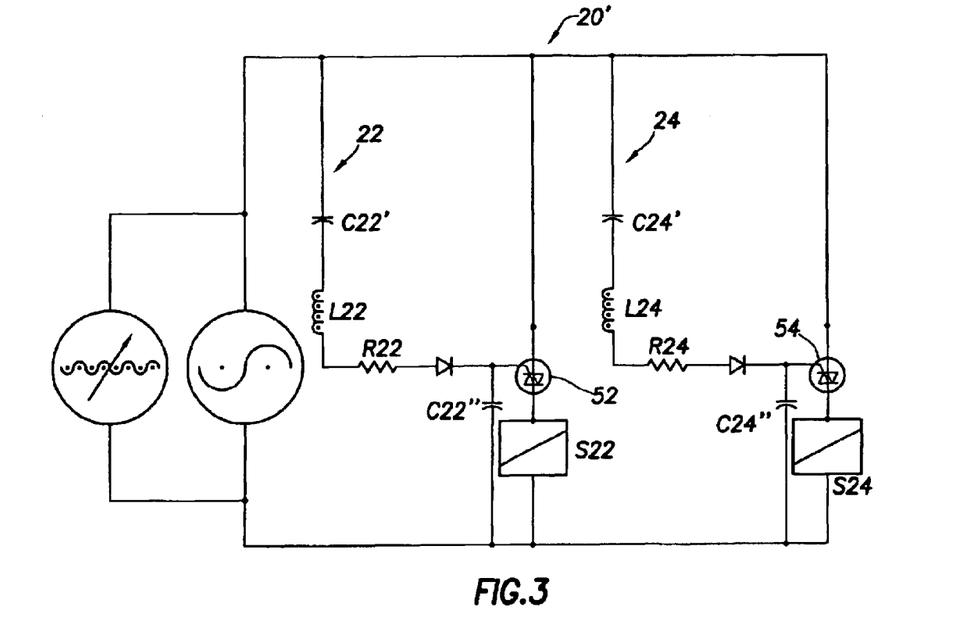
FIG. 3 provides an exemplary diagram of an embodiment of an electrical circuitry of the present invention.

While designing circuits 20(1)–20(11) having sufficiently broad and yet discrete frequency passbands addresses the frequency shifting characteristic of electromotive devices, the electrical conductor which transmits power from power source 100 to circuits 20(1)–20(11) inherently has frequency limitations which would preclude the use of a relatively large number of downhole circuits 20(1)–20(11). Thus it is desirable to control the frequency passbands f1–f11 of frequency selecting units 30(1)–30(11) to minimize the effect of the frequency limitation of the electrical conductor in an effort to broaden the applicability of the present control system 10 to a relatively large number of remote devices. Accordingly, in an alternative embodiment of the present invention, a single directional silicon controlled rectifier for direct current circuits or a bi-directional triac for alternating current circuits can be incorporated into electrical circuitry 20'. As shown in FIG. 3, triac 52 is proximate circuit 22 having capacitance C22' of 0.63 microfarad ($\mu$F), inductance L22 of 1 Henry (H), resistance R22 having a relative value of 100 Ohms, capacitance C22" of 10 $\mu$F and actuable device, illustrated as solenoid S22. Circuit 24 comprises triac 54, capacitance C24' of 0.1 microfarad ($\mu$F), inductance L24 of 1 Henry (H), resistance R24 having a relative value of 100 Ohms, capacitance C24" of 10 $\mu$F and actuable device, illustrated as solenoid S24. Thus, circuits 22, 24 have similar inductance and resistance ratings L22, L24 and R22, R24, respectively, but different capacitance values C22', C24'. Accordingly, power from power source in the appropriate frequency passband is filtered through selected circuit 22 or 24. Power to one terminal of triac 52 or 54 proximate solenoid S22 or S24, respectively, would create a short between the two other triac terminals which then closes the circuit to power solenoid S22 or S24. Triac 52, 54, the so-called "turn-on gates" do not switch circuit 22, 24 closed until power is supplied to one terminal of triac 52, 54. Thus, power from power source 100' is conserved to the other unused circuits which minimize the frequency passband required to operate the desired solenoid throughout its stroke. Triac 52, 54 advantageously allows only the selected solenoid S22 or S24, to receive power, while the other solenoid S24 or S22 receives no power, thus minimizing the frequency limitations inherent in the electrical conductor. The frequency passband widths of circuits 22, 24 are controlled by utilizing triac 52, 54 such that the control system 10 of the present invention can remotely control a relatively large number of actuable devices.

Figure 4:
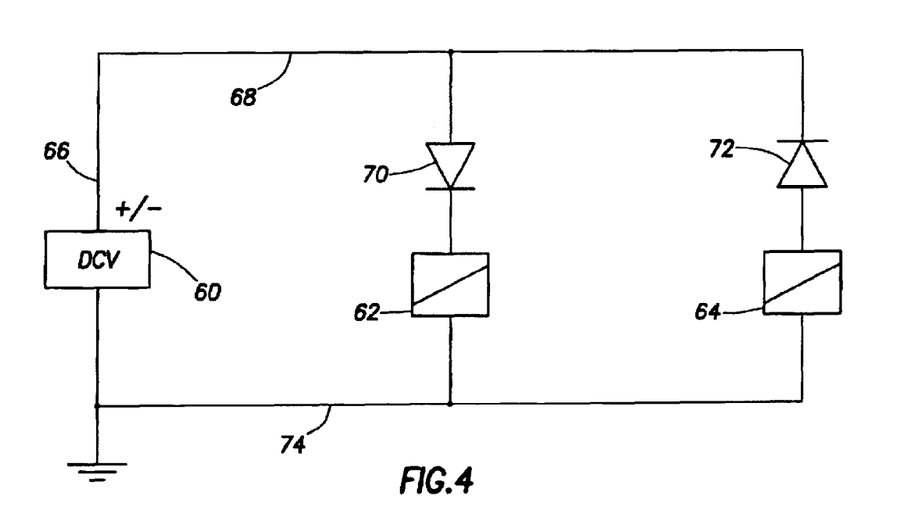
FIG. 4 provides an exemplary diagram of another embodiment of an electrical circuitry of the present invention.

With reference to FIG. 4, there is provided an alternate embodiment in which a DC power source 60 is used to selectively activate two solenoid valves 62 and 64. DC source 60 selectively provides a positive or negative voltage on its output 66 as indicated by the +/− signs. Output 66 is coupled by one conductor 68 of a wireline to the solenoid valves 62, 64. Conductor 68 is coupled to solenoid valve 62 by a diode 70 which has its anode connected to conductor 68 to allow positive voltage to pass through to valve 62. In similar fashion, conductor 68 is coupled to solenoid valve 64 by a diode 72 which has its cathode connected to conductor 68 to allow negative voltage to pass through to valve 62. The power source 60 and solenoid valves 62 and 64 are connected to a common ground 74.

In operation of the FIG. 4 embodiment, either one of valves 62 and 64 may be selectively actuated by activating DC power supply 60 to provide a positive or negative voltage on conductor 68. When power supply 60 is not activated, i.e. supplies no voltage and current to conductor 68, both valves 62 and 64 remain closed. To active valve 62, the DC power source 60 is activated to supply positive voltage to conductor 68. The diode 70 allows current to flow from supply 60, through conductor 68, and the valve 62, thereby activating valve 62. To active valve 64, the DC power source 60 is activated to supply negative voltage to conductor 68. The diode 72 allows current to flow from supply 60, through conductor 68, and the valve 64, thereby activating valve 64 in this way, a single wireline conductor 68 may be used to selectively actuate either one of two separate downhole devices.

In yet another embodiment of the present invention, a high temperature operational amplifier or op-amp (not shown) configured to act as an active passband filter, could be utilized in electrical circuit 20, 20' to effectively control the frequency passband of circuits 20, 22, 24. Each circuit 20, 22, 24 would have a uniquely rated op-amp operating in conjunction with the triac or rectifier in series with the solenoid so that power in the appropriate frequency passband flowing at the designed rate of current would actuate the corresponding device.

While preferred embodiments have been shown and described, various modifications and substitutions may be made thereto without departing from the spirit and scope of the invention. For example, the present invention can be readily adapted to control any of a number of actuable devices which are located in a remote environment such as in a well. Those skilled in the art would readily see other embodiments within the scope of the invention. Accordingly it is to be understood that the control system of the present invention has been described by way of illustration only and not by way of limitation.

What is claimed is:

1. A system for selectively transmitting electrical power, comprising:
   a power source;
   an electrical conductor coupled to said power source; and
   a frequency selecting unit coupled to said electrical conductor wherein said frequency selecting unit selectively filters as a function of frequency the power from said power source through said frequency selecting unit;
   wherein said frequency selecting unit comprises a reactive electromotive device selected from the group consisting of a solenoid, a motor and a piezoelectric device.

2. The system of claim 1 wherein said frequency selecting unit comprises capacitance and inductance characteristics for selective filtering of power through said frequency selecting unit.

3. The system of claim 1 wherein said electrical conductor is an electric wireline.

4. The system of claim 3 wherein said frequency selecting unit comprises capacitance and inductance characteristics for selective filtering of power through said frequency selecting unit.

5. The system of claim 1 wherein said frequency selecting unit comprises a circuit having a passband frequency to selectively filter power transmitted at a frequency within said circuit passband frequency through said frequency selecting unit.

6. The system of claim 5 wherein said circuit of said frequency selecting unit comprises capacitance and inductance characteristics for selective filtering of power through said frequency selecting unit.

7. A method of selectively transmitting variable frequency power from a power source to a plurality of devices, comprising:
   providing a plurality of frequency selecting units, each unit corresponding to one remote device and operatively associated in series therewith, wherein each of the frequency selecting units comprises a circuit having a discrete operating frequency passband;

coupling the power source to the plurality of frequency selecting units by an electrical conductor; and each one of said plurality of frequency selecting units selectively filtering power transmitted from the power source at a frequency within the discrete operating frequency passband of said one of said plurality of frequency selecting units to operate the remote device corresponding to said one of said plurality of frequency selecting units serially associated therewith.

8. The method of claim 7 wherein the remote devices are selected from the group consisting of fluid flow control valves, packers, slidable sleeves, mandrels, motors batteries and telemetry systems.

9. The method of claim 7 wherein at least one of said frequency selecting units comprises a reactive electromotive device.

10. The method of claim 9 wherein said reactive electromotive device is selected from the group consisting of a solenoid, a motor and a piezoelectric device.

11. A system for selectively transmitting electrical power comprising:

a power source;

an electrical conductor coupled to said power source; and a plurality of frequency selecting units coupled to said electrical conductor, wherein each of said frequency selecting units selectively filters as a function of frequency the power from said power source through said frequency selecting unit;

wherein at least one of said plurality of frequency selecting units comprises a reactive electromotive device selected from the group consisting of a solenoid, a motor and a piezoelectric device.

12. The system of claim 11 wherein at least one of said frequency selecting units comprises capacitance and inductance characteristics for selective filtering of power through said frequency selecting unit.

13. The system of claim 11 wherein said electrical conductor is an electric wireline.

14. The system of claim 13 wherein at least one of said frequency selecting units comprises capacitance and inductance characteristics for selective filtering of power through said frequency selecting unit.

15. The system of claim 11 wherein each of said frequency selecting units comprises a circuit having a discrete operating frequency passband to selectively filter power transmitted at a frequency within said discrete operating frequency passband through said frequency selecting unit.

16. The system of claim 15 wherein at least one of said frequency selecting units comprises capacitance and inductance characteristics for selective filtering of power through said frequency selecting unit.

17. The system of claim 15 wherein power from said power source transmitted at a frequency is selectively filtered through said frequency selecting unit having the discrete operating frequency passband corresponding to said power frequency.

18. The system of claim 17 wherein at least one of said frequency selecting units comprises capacitance and inductance characteristics for selective filtering of power through said frequency selecting unit.

19. The system of claim 15 wherein power from said power source transmitted at a plurality of frequencies is selectively and simultaneously filtered through said frequency selecting units having discrete operating frequency passbands corresponding to said power frequencies.

20. The system of claim 19 wherein at least one of said frequency selecting units comprises capacitance and inductance characteristics for selective filtering of power through said frequency selecting unit.

21. A system for selectively transmitting electrical power to a device in a remote environment, comprising:

a power source;

a frequency selecting unit corresponding to the remote device and operatively associated in series therewith; and an electrical conductor connecting said power source to said frequency selecting unit, wherein said frequency selecting unit selectively filters as a function of frequency the power from said power source through said frequency selecting unit to operate the remote device serially associated therewith:

wherein said frequency selecting unit comprises a reactive electromotive device selected from the group consisting of a solenoid, a motor and a piezoelectric device.

22. The system of claim 21 wherein said electrical conductor is an electrical wireline.

23. The system of claim 21 wherein the remote device is selected from the group consisting of a fluid flow control valve, a packer, a slidable sleeve, a mandrel, a motor, a battery and a telemetry system.

24. The system of claim 23 wherein said electrical conductor is an electric wireline.

25. A system for selectively transmitting electrical power in a remote environment, comprising:

a power source;

an electrical conductor coupled to said power source; and a frequency selecting unit proximate the remote environment and coupled to said electrical conductor, wherein said frequency selecting unit selectively filters as a function of frequency the power from said power source through said frequency selecting unit;

wherein said frequency selecting unit comprises a reactive electromotive device selected from the group consisting of a solenoid, a motor and a piezoelectric device.

26. The system of claim 25 wherein said frequency selecting unit comprises capacitance and inductance characteristics for selective filtering of power through said frequency selecting unit.

27. The system of claim 25 wherein said electrical conductor is an electrical wireline.

28. The system of claim 27 wherein said frequency selecting unit comprises capacitance and inductance characteristics for selective filtering of power through said frequency selecting unit.

29. The system of claim 25 wherein said frequency selecting unit comprises a circuit having a passband frequency to selectively filter power transmitted at a frequency within said circuit passband frequency through said frequency selecting unit.

30. The system of claim 29 wherein said frequency selecting unit comprises capacitance and inductance characteristics for selective filtering of power through said frequency selecting unit.

31. The system of claim 21 wherein said frequency selecting unit comprises a circuit having a passband frequency to selectively filter power transmitted at a frequency within said circuit passband frequency through said frequency selecting unit to operate the remote device.

32. The system of claim 31 wherein said electrical conductor is an electric wireline.

33. The system of claim 31 wherein the remote device is selected from the group consisting of a fluid flow control valve, a packer, a slidable sleeve, a mandrel, a motor, a battery and a telemetry system.

34. The system of claim 33 where said electrical conductor is an electric wireline.

35. A system for selectively transmitting electrical power in a remote environment, comprising:

a power source;

an electrical conductor coupled to said power source; and a plurality of frequency selecting units proximate the remote environment and coupled to said electrical conductor, wherein each of said frequency selecting units selectively filters as a function of frequency the power from said power source through said frequency selecting unit;

wherein at least one of said plurality of frequency selecting units comprises a reactive electromotive device selected from the group consisting of a solenoid, a motor and a piezoelectric device.

36. The system of claim 35 wherein at least one of said frequency selecting units comprises capacitance and inductance characteristics for selective filtering of power through said frequency selecting unit.

37. The system of claim 35 wherein said electrical conductor is an electric wireline.

38. The system of claim 37 wherein at least one of said frequency selecting units comprises capacitance and inductance characteristics for selective filtering of power through said frequency selecting unit.

39. The system of claim 35 wherein each of said frequency selecting units comprises a circuit having a discrete operating frequency passband to selectively filter power transmitted at a frequency within said discrete frequency passband through said frequency selecting unit.

40. The system of claim 39 wherein at least one of said frequency selecting units comprises capacitance and inductance characteristics for selective filtering of power through said frequency selecting unit.

41. The system of claim 39 wherein power from said power source transmitted at a frequency is selectively filtered through said frequency selecting unit having the discrete operating frequency passband corresponding to said power frequency.

42. The system of claim 41 wherein at least one of said frequency selecting units comprises capacitance and inductance characteristics for selective filtering of power through said frequency selecting unit.

43. The system of claim 39 wherein power from said power source transmitted at a plurality of frequencies is selectively and simultaneously filtered through said frequency selecting units having discrete operating frequency passbands corresponding to said power frequencies.

44. The system of claim 43 wherein at least one of said frequency selecting units comprises capacitance and inductance characteristics for selective filtering of power through said frequency selecting unit.

45. A system for selectively transmitting electrical power to a plurality of devices in a remote environment, comprising:

a frequency power;

a plurality of frequency selecting units corresponding to the remote devices;

each one of said plurality of frequency selecting units operatively associated in series with a corresponding one of said plurality of remote devices;

an electrical conductor connecting said power source to said frequency selecting units; and a plurality of operational amplifiers corresponding to said frequency selecting units, wherein each of said operational amplifiers and corresponding frequency selecting units comprises a circuit having a discrete operating frequency passband, each of said operational amplifiers selectively couples as a function of current and frequency power from said power source to said corresponding frequency selecting unit to selectively operate said corresponding remote device operatively associated in series therewith.

46. The system of claim 45 wherein the devices are selected from the group consisting of fluid flow control valves, packers, slidable sleeves, mandrels motors, batteries and telemetry systems.

47. The system of claim 45 wherein power from said power source transmitted at a selected current and frequency is filtered through said circuit having the operational amplifier corresponding to said power current and frequency to operate said corresponding remote device.

48. The system of claim 47 wherein said electrical conductor is an electric wireline.

49. The system of claim 45 wherein power from said power source transmitted at a plurality of selected currents and frequencies simultaneously is filtered through said circuits having the operational amplifiers corresponding to said power current and frequency to operate said corresponding remote devices.

50. The system of claim 49 wherein said electrical conductor is an electric wireline.

51. A system for selectively transmitting electrical power in a downhole environment, comprising:

a power source;

an electrical conductor coupled to said power source; and a frequency selecting unit proximate the downhole environment and coupled to said electrical conductor, wherein said frequency selecting unit selectively filters as a function of frequency the power from said power source through said frequency selecting unit.

52. The system of claim 51 wherein said frequency selecting unit comprises capacitance and inductance characteristics for selective filtering of power through said frequency selecting unit.

53. The system of claim 51 wherein said frequency selecting unit comprises a circuit having a pasoband frequency to selectively filter power transmitted at a frequency within said circuit passband frequency through said frequency selecting unit.

54. The system or claim 53 wherein said frequency selecting unit comprises capacitance and inductance characteristics for selective filtering of power through said frequency selecting unit.

55. The system of claim 54 wherein said frequency selecting unit comprises a reactive electromotive device.

56. The system of claim 55 wherein said reactive electromotive device is selected from the group consisting of a solenoid, a motor and a piezoelectric device.

57. The system of claim 51 wherein said electrical conductor is an electrical wireline.

58. The system of claim 57 wherein said frequency selecting unit comprises capacitance and inductance characteristics for selective filtering of power through said frequency selecting unit.

59. A system for selectively transmitting electrical power in a downhole environment, comprising:

a power source;

an electrical conductor coupled to said power source; and a plurality of frequency selecting units proximate the downhole environment and coupled to said electrical conductor, wherein each at said frequency selecting units selectively filters as a function of frequency the power from said power source through said frequency selecting unit.

60. The system of claim 59 wherein at least one of said frequency selecting units comprises capacitance and inductance characteristics for selective filtering of power through said frequency selecting unit.

61. The system of claim 59 wherein each of said frequency selecting units comprises a circuit having a discrete operating frequency passband to selectively filter power transmitted at a frequency within said discrete frequency passband through said frequency selecting unit.

62. The system of claim 61 wherein at least one of said frequency selecting units comprises capacitance and inductance characteristics for selective filtering of power through said frequency selecting unit.

63. The system of claim 62 wherein at least one of said frequency selecting units comprises a reactive electromotive device.

64. The system of claim 63 wherein said reactive electromotive device is selected from the group consisting of a solenoid, a motor and a piezoelectric device.

65. The system of claim 61 wherein power from said power source transmitted at a frequency is selectively filtered through said frequency selecting unit having the discrete operating frequency passband corresponding to said power frequency.

66. The system of claim 65 wherein at least one of said frequency selecting units comprises capacitance and inductance characteristics for selective filtering of power through said frequency selecting unit.

67. The system of claim 66 wherein at least one of said frequency selecting units comprises a reactive electromotive device.

68. The system of claim 67 wherein said reactive electromotive device is selected from the group consisting of a solenoid, a motor and a piezoelectric device.

69. The system of claim 61 wherein power from said power source transmitted at a plurality of frequencies is selectively and simultaneously filtered through said frequency selecting units having discrete operating frequency passbands corresponding to said power frequencies.

70. The system of claim 69 wherein at least one of said frequency selecting units comprises capacitance and inductance characteristics for selective filtering of power through said frequency selecting unit.

71. The system of claim 70 wherein at least one of said frequency selecting units comprises a reactive electromotive device.

72. The system of claim 71 wherein said reactive electromotive device is selected from the group consisting of a solenoid, a motor and a piezoelectric device.

73. The system of claim 59 wherein said electrical conductor is an electric wireline.

74. The system of claim 73 wherein at least one of said frequency selecting units comprises capacitance and inductance characteristics for selective filtering of power through said frequency selecting unit.

75. A system for selectively transmitting electrical power to a plurality of devices in a remote environment, comprising:

a power source;

a plurality of frequency selecting units corresponding to the remote devices, wherein each of said frequency selecting units comprises a circuit having a discrete operating frequency passband and wherein each one of said frequency selecting units is operatively associated in series with a corresponding one of said remote devices;

an electrical conductor connecting said power source to said frequency selecting units; and a plurality of voltage control switches corresponding to each of said circuits, each of said voltage control switches is triggered when said power is transmitted within the passband frequency of the corresponding circuit for filtering through the frequency selecting unit to selectively operate said corresponding remote device.

76. The system of claim 75 wherein at least one of said voltage control switches is a triac.

77. The system of claim 75 wherein said electrical conductor is an electric wireline.

78. The system of claim 75 wherein at least one of said frequency selecting units comprises a reactive electromotive device.

79. The system of claim 78 wherein at least one of said voltage control switches is a triac.

80. The system of claim 79 wherein said reactive electromotive device is selected from the group consisting of a solenoid, a motor and a piezoelectric device.

81. The system of claim 75 wherein power from said power source transmitted at a frequency is selectively filtered through said frequency selecting unit having the discrete operating frequency passband corresponding to said power frequency to operate said corresponding remote device.

82. The system of claim 81 wherein at least one of said voltage control switches is a triac.

83. The system of claim 81 wherein said electrical conductor is an electric wireline.

84. The system of claim 81 wherein at least one of said frequency selecting units comprises a reactive electromotive device.

85. The system of claim 84 wherein at least one of said voltage control switches is a triac.

86. The system of claim 85 wherein said reactive electromotive device is selected from the group consisting of a solenoid, a motor and a piezoelectric device.

87. The system of claim 75 wherein power from said power source transmitted at a plurality of frequencies is selectively and simultaneously filtered through said frequency selecting units having discrete operating frequency passbands corresponding to said power frequencies to operate said corresponding remote devices.

88. The system of claim 87 wherein at least one of said voltage control switches is a triac.

89. The system of claim 87 wherein said electrical conductor is an electric wireline.

90. The system of claim 87 wherein at least one of said frequency selecting units comprises a reactive electromotive device.

91. The system of claim 90 wherein at least one of said voltage control switches is a triac.

92. The system of claim 91 wherein said reactive electromotive device is selected from the group consisting of a solenoid, a motor and a piezoelectric device.

93. A system for selectively transmitting electrical power to a plurality of devices in a remote environment, comprising:

a power source;

a plurality of frequency selecting units corresponding to the remote devices and operatively associated therewith, each one of said plurality of frequency selecting units operatively associated in series with a corresponding one of said plurality of remote devices; and an electrical conductor connecting said power source to said frequency selecting units, wherein each of said frequency selecting units selectively filters as a function of frequency the power from said power source through said frequency selecting unit to operate said corresponding remote device serially associated therewith.

94. The system of claim 93 wherein said electrical conductor is an electric wireline.

95. The system of claim 93 wherein at least one of said frequency selecting units comprises a reactive electromotive device.

96. The system of claim 95 wherein said reactive electromotive device is selected from the group consisting of a solenoid, a motor and a piezoelectric device.

97. The system of claim 93 wherein each of said corresponding frequency selecting units comprises a circuit having a discrete operating frequency passband to selectively filter power transmitted at a frequency within said discrete operating frequency passband through said frequency selecting unit to operate the corresponding remote device.

98. The system of claim 97 wherein said electrical conductor is an electric wireline.

99. The system of claim 97 wherein at least one of said frequency selecting units comprises a reactive electromotive device.

100. The system of claim 99 wherein said reactive electromotive device is selected from the group consisting of a solenoid, a motor and a piezoelectric device.

101. The system of claim 97 wherein the remote devices are selected from the group consisting of fluid flow control valves, packers, slidable sleeves, mandrels, motors, batteries and telemetry systems.

102. The system of claim 101 wherein said electrical conductor is an electric wireline.

103. The system of claim 101 wherein at least one of said frequency selecting units comprises a reactive electromotive device.

104. The system of claim 103 wherein said reactive electromotive device is selected from the group consisting of a solenoid, a motor and a piezoelectric device.

105. The system of claim 97 wherein power from said power source transmitted at a frequency is selectively filtered through said frequency selecting unit having the discrete operating frequency passband corresponding to said power frequency to operate the corresponding remote device.

106. The system of claim 105 wherein said electrical conductor is an electric wireline.

107. The system of claim 105 wherein said at least one of said frequency selecting units comprises a reactive electromotive device.

108. The system of claim 107 wherein said reactive electromotive device is selected from the group consisting of a solenoid, a motor and a piezoelectric device.

109. The system of claim 105 wherein the remote devices are selected from the group consisting of fluid flow control valves, packers, slidable sleeves, mandrels, motors, batteries and telemetry systems.

110. The system of claim 109 wherein said electrical conductor is an electric wireline.

111. The system of claim 109 wherein at least one of said frequency selecting units comprises a reactive electromotive device.

112. The system of claim 111 wherein said reactive electromotive device is selected from the group consisting of a solenoid, a motor and a piezoelectric device.

113. The system of claim 97 wherein power from said power source transmitted at a plurality of frequencies is selectively and simultaneously filtered through said frequency selecting units having discrete operating frequency passbands corresponding to said power frequencies to operate the corresponding remote devices.

114. The system of claim 113 wherein said electrical conductor is an electric wireline.

115. The system of claim 113 wherein at least one of said frequency selecting units comprises a reactive electromotive device.

116. The system of claim 115 wherein said reactive electromotive device is selected from the group consisting of a solenoid, a motor and a piezoelectric device.

117. The system of claim 113 wherein said remote devices are selected from the group consisting of fluid flow control valves, packers, slidable sleeves, mandrels, motors, batteries and telemetry systems.

118. The system of claim 117 wherein said electrical conductor is an electric wireline.

119. The system of claim 117 wherein at least one of said frequency selecting units comprises a reactive electromotive device.

120. The system of claim 119 wherein said reactive electromotive device is selected from the group consisting of a solenoid, a motor and a piezoelectric device.

121. The system of claim 93 wherein the remote devices are selected from the group consisting of fluid flow control valves, packers, slidable sleeves, mandrels, motors, batteries and telemetry systems.

122. The system of claim 121 wherein said electrical conductor is an electric wireline.

123. The system of claim 121 wherein at least one of said frequency selecting units comprises a reactive electromotive device.

124. The system of claim 123 wherein said reactive electromotive device is selected from the group consisting of a solenoid, a motor and a piezoelectric device.

* * * * *